United States Patent
Hoy et al.

(10) Patent No.: US 8,320,527 B2
(45) Date of Patent: Nov. 27, 2012

(54) CROSSOVER FAULTS DETECTION IN TWO-WIRES NETWORK

(75) Inventors: Michael Davey Hoy, Ipswich (GB); Deepak Arya, Middlesex (GB)

(73) Assignee: British Telecommunications Public Limited Company, London (GB)

( * ) Notice: Subject to any disclaimer, the term of this patent is extended or adjusted under 35 U.S.C. 154(b) by 186 days.

(21) Appl. No.: 12/933,161

(22) PCT Filed: Feb. 18, 2009

(86) PCT No.: PCT/GB2009/000447
§ 371 (c)(1),
(2), (4) Date: Dec. 27, 2010

(87) PCT Pub. No.: WO2009/115767
PCT Pub. Date: Sep. 24, 2009

(65) Prior Publication Data
US 2011/0110501 A1 May 12, 2011

(30) Foreign Application Priority Data
Mar. 17, 2008 (GB) .................................. 0804994.2

(51) Int. Cl.
*H04M 1/24* (2006.01)
*H04M 3/08* (2006.01)
*H04M 3/22* (2006.01)

(52) U.S. Cl. .................... 379/22.03; 379/14.01; 379/23; 379/27.02

(58) Field of Classification Search .................. 379/1.01, 379/9, 9.04, 14.01, 10.01, 15.01, 22, 22.03, 379/23, 27, 27.01, 27.02, 31, 32.01, 32.02, 379/32.04, 25

See application file for complete search history.

(56) References Cited

U.S. PATENT DOCUMENTS

| | | | | |
|---|---|---|---|---|
| 6,385,297 | B2 * | 5/2002 | Faulkner et al. | 379/1.04 |
| 7,031,435 | B2 * | 4/2006 | Andrews et al. | 379/1.01 |
| 7,305,067 | B1 * | 12/2007 | Diggle, III | 379/27.03 |
| 2008/0205501 | A1 * | 8/2008 | Cioffi et al. | 375/224 |
| 2011/0188640 | A1 * | 8/2011 | Cioffi et al. | 379/27.01 |

FOREIGN PATENT DOCUMENTS

| | | |
|---|---|---|
| DE | 29 10 897 A1 | 10/1980 |
| WO | WO 02/080506 A1 | 10/2002 |

* cited by examiner

*Primary Examiner* — Binh Tieu
(74) *Attorney, Agent, or Firm* — Patterson Thuente Christensen Pedersen, P.A.

(57) ABSTRACT

A system and method for detecting crossover faults in a telecommunications access network having a plurality of access lines. Each access line includes a pair of wires for connection to a user terminal, e.g. a telephone handset. The system includes a monitor for monitoring each of the access lines to detect the presence of an off-hook state; a current sensor for each of the access lines for determining a fault condition on an access line for which an off-hook state has been detected when a imbalance is detected between currents in the wires of the access line; a controller for generating a report of each fault condition determined on an access line, in which each report comprises a time record relating to the time of generation of the report; and a crossover fault detector for recording a possible crossover fault involving two access lines upon the reporting within a set time period of one or more fault condition on each of the two access lines.

13 Claims, 2 Drawing Sheets

CROSSOVER FAULTS DETECTION IN
TWO-WIRES NETWORK

PRIORITY CLAIM

The present application is a National Phase entry of PCT Application No. PCT/GB2008/000447, filed Feb. 18, 2009, which claims priority from Great Britain Application Number 0804994.2, filed Mar. 17, 2008, the disclosures of which are hereby incorporated by reference herein in their entirety.

TECHNICAL FIELD

The invention is directed towards access circuits in telecommunications networks and, in particular, to detecting faults in such access circuits.

BACKGROUND

A telecommunications access network links via access lines the individual subscribers' equipment (e.g. telephone set or other user terminal equipment) with the public switched telephone network. The network comprises mainly of access lines leading from the customer premises to a local telephone exchange. Either at the telephone exchange or at some intermediate concentration point, each access line is terminated at a line interface.

The conventional line interface comprises a telephone system subscriber line interface circuit (SLIC) and a subscriber line audio-processing circuit (SLAC). The SLIC connects a balanced two-wire transmission path (the path to and from the subscriber telephone set) with an unbalanced four wire transmission path (the connection with the telephone exchange). The SLIC performs various functions, including battery feed, supervision function, over voltage protection, ringing, signaling, hybrid (two-to-four wire conversion), timing, and ring-trip detection function. The functionality of a SLIC is often expressed as "BORSHT" (Battery, Over-voltage, Ringing, Supervision, Hybrid and Testing). The battery feed function supplies DC current to the telephone sets to allow for telephone communication. Part of the supervisory functions involves monitoring whether the telephone sets are either on-hook or off-hook.

The exchange (or switch) is usually a digital exchange. In legacy networks this may be a digital local exchange (DLE), handling traffic to and from a plurality of concentrators, each concentrator handling a plurality of individual access lines. In next-generation networks (NGN), the exchange may be a call server handling traffic to and from a plurality of MSANs: each MSAN handling a plurality of individual access lines. In the NGN, the plurality of MSANs is controlled for call handling purposes by a call server and managed for configuration, administration and fault handling purposes by an element manager, whereas, in the legacy case, the plurality of concentrators are controlled by the DLE. The coupling between the SLIC and the exchange normally involves pulse code modulation (PCM), where the signals pass to the exchange through a CODEC and other audio processing (typically provided in the SLAC). SLIC and SLAC design is well known and need not be considered in further detail.

Typically, in telecommunications access networks, lines connecting a telephone set to a line interface may share physical space with other such lines, including passing through the same access cable and cable joints. Each line comprises two wires: known as the A-wire and the B-wire. Manual operations, such as joining cables and wiring distribution frames, are prone to human error which can lead to misconnections, including cross-connected wires—so-called "crossover fault". A crossover fault occurs when one of the wires from a two-wire access line is inadvertently crossed with a wire from a different two-wire access line. The crossover may involve two A-wires or two B-wires. There is therefore a need for a way to reliably detect occurrences of the crossover fault conditions in the access network.

SUMMARY

Embodiments provide a method for detecting crossover faults in a telecommunications access network, in which the access network comprises a plurality of access lines in which each access line comprises a pair of wires for connection to a user terminal; the method including: monitoring each of the access lines to detect an off-hook state; checking for current flow in each wire of each of the access lines for which an off-hook state is detected; determining a fault condition for each access line for which an off-hook state is detected; when an imbalance is detected between currents in the wires of the access line; creating a fault report for each fault condition determined for an access line in which the fault report comprises a record of the time of creating the report; and recording a crossover fault involving two of the access lines when one or more fault condition is reported on each of the two access lines within a set time period.

According to an embodiment the method includes setting the time period in dependence on access network characteristics.

Crossover fault detection may be improved by monitoring for sequences of faulty off-hook reports. According to an embodiment the method includes monitoring sequences of occurrences of the fault condition on the two access lines; and recording a crossover fault involving the two access lines when a sequence of consecutive faults is reported for each of the two access lines. According to an embodiment the method includes recording a crossover fault involving the two access lines when a sequence of consecutive faults is reported on each of the two access lines and when each fault in a first one of the sequences forms a pair with a corresponding fault in the other one of the sequences and each fault of a pair of faults is reported within a set time period of the other fault of the pair. According to a further embodiment the method includes adjusting the length of the required sequence of consecutive faults so that the sequence length is greater for longer time periods.

According to an embodiment the method includes creating the fault report in one of a line interface and a controller. According to an embodiment the method includes sending the fault report to a controller for recording the possible crossover fault involving the two access lines. According to a further embodiment the controller is one of a MSAN, an element manager, a call server, a network management system and an OSS.

Embodiments also provide a system for detecting crossover faults in a telecommunications access network, in which the access network comprises a plurality of access lines in which each access line comprises a pair of wires for connection to a user terminal; in which the system comprises: a monitor for monitoring each of the access lines to detect the presence of an off-hook state; a current sensor for each of the access lines for determining a fault condition on an access line for which an off-hook state has been detected when a imbalance is detected between currents in the wires of the access line; a controller for generating a report of each fault condition determined on an access line; in which each report comprises a time record relating to its time of generation; a crossover fault detector for comparing reports of fault conditions and recording a crossover fault involving two access lines upon the reporting within a set time period of a fault condition on each of the two access lines.

According to an embodiment, the crossover fault detector is arranged in use to vary the time period in dependence on access network characteristics.

According to an embodiment, the crossover fault detector is arranged in use to monitor sequences of occurrences of the fault condition on the two access lines; and to record the possible crossover fault involving the two access lines when a sequence of consecutive faults is recorded on each of the two access lines.

According to an embodiment, the crossover fault detector is arranged in use to record the possible crossover fault involving the two access lines when a sequence of consecutive faults is recorded on each of the two access lines and when each fault in a first one of the sequences forms a pair with a corresponding fault in the other one of the sequences and each fault of a pair of faults is recorded within a set time period of the other fault of the same pair.

According to an embodiment, the crossover fault detector is arranged in use to adjust the length of the required sequence of consecutive faults so that the sequence length is greater for longer time periods.

BRIEF DESCRIPTION OF THE DRAWINGS

In order to aid understanding, embodiments of the invention will now be described by way of example with reference to the drawings in which.

DETAILED DESCRIPTION

It will be understood that embodiments have application in a variety of access networks, including both those known as legacy and NGN. For simplicity, the following description will refer to NGNs composed of element managers, call servers and MSANs operating under a network management system or operations support system (OSS) but it will be understood that alternative embodiments of the invention apply to legacy networks composed of DLEs and concentrators operating under a network management system or OSS.

Figure 1:
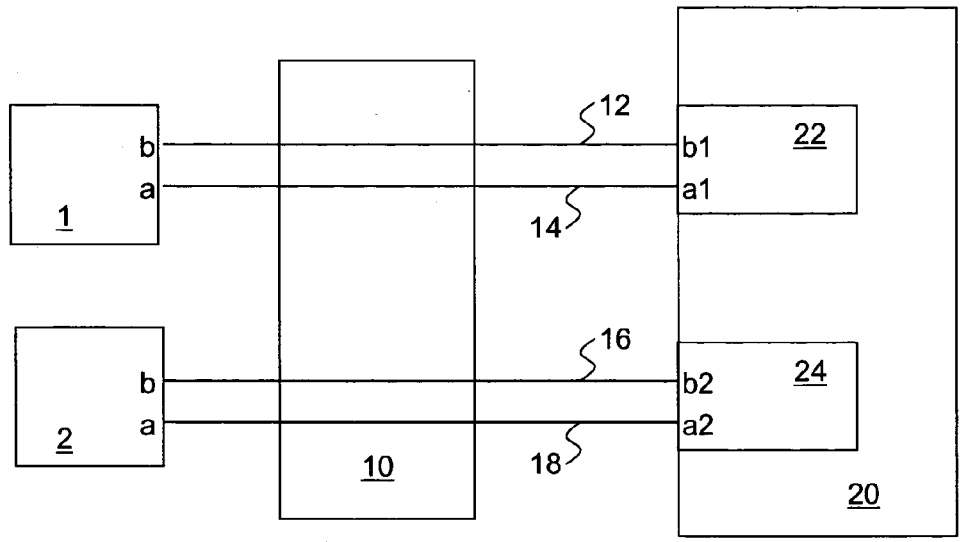
FIG. 1 shows a schematic of part of an access network in normal operation.

FIG. 1 shows two access lines in an access network connecting user terminals (e.g. telephone sets) 1, 2 via connection point 10 (which may be in the form of a street cabinet) to MSAN 20 (typically housed in an exchange building). FIG. 1 shows line interface 22 for providing telephone service to a user (not shown) at user terminal 1 and line interface 24 for providing telephone service to a second user (not shown) at user terminal 2. Line interfaces 22, 24 are located at MSAN 20. Line interface 22 provides two-wire termination a1, b1 for wires 12, 14 and line interface 24 provides two-wire termination a2, b2 for wires 16, 18. User terminal 1 is connected to line interface 22 of MSAN 20 via wires 12, 14. User terminal 2 is connected to line interface 24 of MSAN 20 via wires 16, 18. As shown in FIG. 1, wires 12, 14, 16, 18 are correctly connected as follows: wire 12 connects user terminal 1 b to line interface 22 b1; wire 14 connects user terminal 1 a to line interface 22 a1; wire 16 connects user terminal 2 b to line interface 24 b2 and wire 18 connects user terminal 2 a to line interface 24 a2. Hence operation of either of user terminals 1 or 2 in processing either an incoming or an outgoing call can proceed with no effect on the other one of user terminals 1 and 2.

Figure 2:
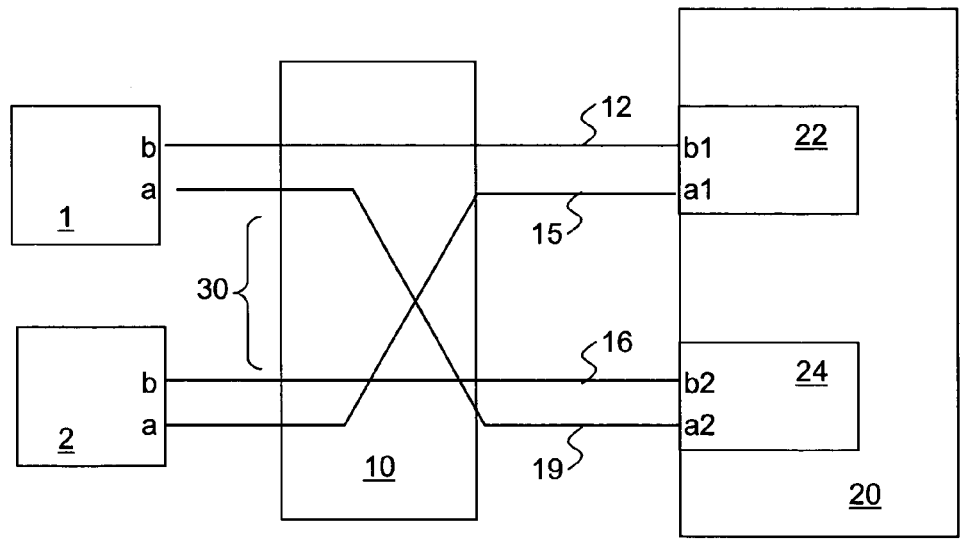
FIG. 2 shows a schematic of part of an access network with a crossover fault.

FIG. 2 illustrates a typical fault scenario. FIG. 2 shows two access lines in an access network as in FIG. 1 but now with crossover fault 30 in connection point 10. FIG. 2 does not have the four correct connections between MSAN 20 and user terminals 1 and 2. Instead of correctly-connected wires 14, 18, FIG. 2 has wires 15, 19. As illustrated in FIG. 2, crossover fault 30 occurs when wire 15 from two-wire access line 12, 15 is inadvertently crossed with wire 19 from different two-wire access line 16, 19. Wire 15 is incorrectly connected at connection point 10 so that it connects line interface 22 a1 to user terminal 2 a (instead of connecting to user terminal 1 a). Wire 19 connects line interface 24 a2 to user terminal 1 a (instead of user terminal 2 a). Wires 12 and 16 are correctly connected between the respective interface on MSAN 20 and the appropriate user terminal, as before.

It should be understood that, what is in effect an A-wire or B-wire crossover between two line interfaces may occur between different line cards using different technology, as well as between different pieces of equipment (e.g. MSAN, DLE, exchange), possibly located in different buildings but where the lines share, at some point, the same physical space. For simplicity, we shall describe here the case where both interfaces are connected to a single MSAN.

An A-wire and B-wire pair is designed to operate as a balanced pair in the off-hook state with current in one wire being "balanced" by a current of similar magnitude but opposite sense in the other wire. The crossover fault type shown in FIG. 2 generally results in an imbalance, i.e. a difference between the magnitudes of the currents flowing in the A-wire and in the B-wire of each of the two line interfaces 22, 24 when one of user terminals 1, 2 is off-hook. Such an imbalance may still result in the interface detecting current and erroneously registering an off-hook state (so-called faulty off-hook). Use here of the term "off-hook state" is to be understood as including faulty off-hook state. When configured with appropriate software, modern line interfaces have the capability for the measurement of differences between line currents in the A-wire and the B-wire of a pair and hence are capable of detecting faulty off-hook conditions. The crossover fault results in both of line interfaces 22 and 24 of MSAN 20 detecting an off-hook condition when a single user terminal is off-hook. Only if both user terminals 1, 2 are off-hook simultaneously, may the current in each line interface 22, 24 appear balanced. Even when both user terminals 1, 2 are off-hook in the presence of a crossover fault, differences in line resistance and configured line current may result in a detectable current imbalance between the A-wire and the B-wire at an interface.

Figure 3:
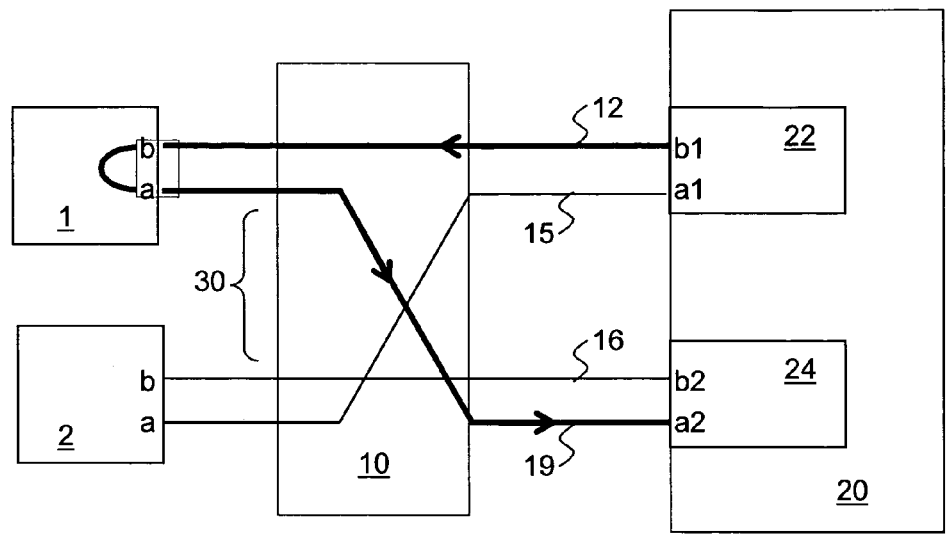
FIGS. 3 and 4 illustrate current flows in parts of an access network showing a crossover fault.
Figure 4:
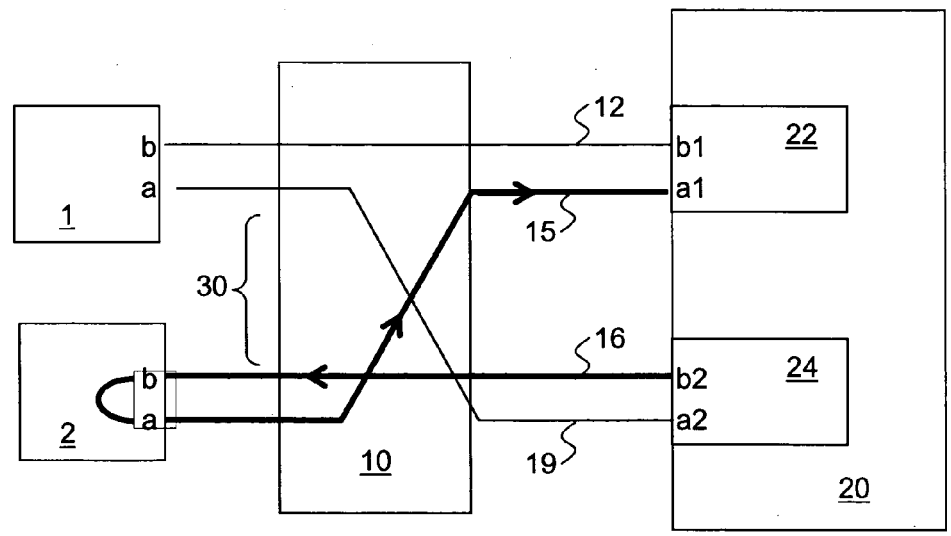

The effect of the crossover fault of FIG. 2 will now be described with reference to FIGS. 3 and 4. In FIGS. 3 and 4 the current flow in the access network is indicated by the bold lines with the arrow heads indicating the direction of current flow (negative current convention assumed). The situation when user terminal 1 goes off-hook is illustrated in FIG. 3. In FIG. 3, the off-hook of user terminal 1 is indicated by the loop between user terminal 1 b and 1 a. This loop results in current flow from line interface 22 b1 through user terminal 1 b to user terminal 1 a and then via the crossover fault in connection point 10 to interface line 24 a2. As can be seen from FIG. 3, the result of the crossover fault in connection point 10 is that, when user terminal 1 goes off-hook both line interfaces 22 and 24 detect line current. By way of contrast, it will be understood that in the absence of a crossover fault, as illustrated by the access network of FIG. 1, taking user terminal 1 off-hook would result in the current flow from line interface 22 b1 via user terminal 1 b and 1 a and back to line interface 22 a1. Hence in the fault-free arrangement of FIG. 1, the effect of user terminal 1 going off-hook will be that current is detected only at line interface 22 and not at line interface 24.

The effect of user terminal 2 going off-hook in the presence of a crossover fault at connection point 10 is shown in FIG. 4. As can be seen from FIG. 4, taking user terminal 2 off hook will create a loop between user terminal 2 b and 2 a and will result in current flowing from line interface 24 b2 via user terminal 2 b, user terminal 2 a and then to line interface 22 a1. Hence the result of taking user terminal 2 off hook in the presence of the crossover fault in connection point 10 is that both line interfaces 22 and 24 will detect current.

Crossover faults will affect operation during both outgoing and incoming calls.

Outgoing Calls

During an off-hook condition generated as the result of a user initiating a call from their user terminal, a crossover fault can be detected by the line interface detecting a current imbalance, i.e. a difference between the A-wire and B-wire currents of 25 mA or more. Once the line interface has detected a faulty off-hook state, the MSAN performs the following actions:

a) prevent the faulty off-hook being reported to the call server so as to prevent the application of proceed indication to the line interface (i.e. suppress the normal call set-up procedure);

b) ignore any digits dialled, following the faulty off-hook;

c) create a "faulty off-hook detected" report for the interface(s) concerned including a record of the time of creation of the report;

d) set the interface(s) concerned into a "faulty off-hook detected" state.

e) continue to monitor the interface(s) and, on removal of the faulty off-hook condition, create a "faulty off-hook ceased" report for the interface(s) concerned including a record of the time of creation of the report.

In the case of an A-wire or B-wire crossover fault, the two line interfaces affected detect faulty off-hooks independently.

Incoming Calls

Incoming Calls with Line Interface in Faulty Off-Hook Condition

As will be appreciated from the above description of the outgoing-call faulty off-hook condition, the MSAN does not notify the call server of having detected this condition. As a result, there is nothing to stop the call server attempting to connect an incoming call to a user terminal that is displaying the faulty off-hook condition. If an incoming call arrives while an interface is already in the faulty off-hook detected state, the MSAN responds by reporting ITU-T recommendation H.248 error code 540 (invalid hook state) to the call server and thereby causes the incoming call to be rejected by the call server.

Incoming Calls with Line Interface in Idle State

If an incoming call arrives while an interface is in the idle state (i.e. no faulty off-hook currently detected), then the MSAN performs the normal procedures for answer validation as defined in the appropriate line interface specification. During answer validation, the line current is monitored and, if the difference in magnitude between the A-wire and B-wire currents is 25 mA or more, then MSAN 20 recognizes this current difference as a faulty off-hook condition.

On recognition of the faulty off-hook condition, MSAN 20 sets the interface(s) concerned into a "faulty off-hook detected" state and prevents the faulty off-hook being reported to the call server thereby ensuring the caller is not charged and remains in receipt of ring tone. Ensuring the faulty off-hook is not reported to the call server, preserves metering integrity under this fault condition, since the answering party in the cross-over fault scenario may not be the called party. This action prevents a charge for a potentially misrouted call. Number unobtainable (NU) tone is then applied to the called line interface, so as to indicate the existence of the problem to the called end.

MSAN 20 creates a time-recorded faulty off-hook detected report for the interfaces concerned. MSAN 20 continues to monitor the line interface(s) and on removal of the faulty off-hook condition, creates a time-recorded faulty off-hook ceased report and remains in the faulty off-hook state until the originating caller clears.

Where the non-called terminal 2, rather than the called terminal 1, goes off-hook in response to the applied ringing, the off-hook condition is detected by the called interface 22 which responds to validate the detected off-hook condition by applying normal current feed to the pair at a1 b1. Application of the normal current feed results in either a battery to A-wire fault (in the case of B-wire crossover)* or earth to B-wire fault (in the case of A-wire crossover). Both these fault conditions give rise to a current in one wire of a pair with no corresponding current in the other wire of the pair at non-called interface 24 a2, b2 and result in a faulty off-hook condition being detected at non-called interface 24. Non-called interface 24 responds to the faulty off-hook condition as for an outgoing call, as set out above in steps (a) to (e).

As indicated above, line interfaces have the capability for the measurement of differences between line currents in the A-wire and the B-wire and hence are capable of detecting faulty off-hook conditions, however, faulty off-hook conditions, can arise as a result of forms of fault other than a crossover. These other forms of fault include the pure mimic and pseudo mimic faults which will be described next.

Pure Mimic

A pure mimic of the A or B wire crossover faults can occur when the connection to a single line interface is subjected to one of two access network contact faults, i.e. either:

an earth connection to the B-wire of sufficiently low resistance to cause a seize to be detected by the line interface; or a battery connection to the A-wire of sufficiently low resistance to cause a seize to be detected by the line interface.

Both these fault conditions give rise to a current in one wire of a pair with no corresponding current in the other wire of the pair and result in a faulty off-hook condition that must be discriminated from a normal off-hook condition, where the magnitude of the A-wire current is nominally equal to that of the B-wire current.

Pseudo Mimic

A pseudo mimic of the A or B wire crossover faults is an extreme case that can occur when the connection to a single line interface is subjected to one of two access network contact faults, i.e. either:

an earth connection to the A-wire; or a battery connection to the B-wire.

At sufficiently low contact resistances, both these types of fault will result in large differences between the current flowing in the A-wire and in the B-wire. The resulting current differential, measured at the line interface may exceed 25 mA and result in detection of a faulty off-hook condition.

Crossover Fault Detection

We have seen that there are a number of potential causes of faulty off-hook conditions at interfaces in the access network. We now describe, by way of example, techniques for discriminating, according to embodiments, between true crossover faults and other types of fault which can generate faulty off-hook conditions.

According to embodiments, where a correlation or link is established between faulty off-hook notifications from two interfaces, the identification and subsequent notification of faulty off-hook conditions can be used to identify lines which suffer from a crossover fault. According to an embodiment, reports of faulty off-hook conditions are monitored and a crossover fault identified where one or more faulty off-hook conditions are detected in each one of a pair of access lines. In order to implement an embodiment a reconfiguration is required of the MSAN to arrange for the appropriate notification of faulty off-hook conditions. The MSAN may need further reconfiguration to arrange for crossover faults between lines terminated at that MSAN to be detected locally. The element manger (not shown) may need reconfiguration to arrange for crossover faults between lines terminated at MSANs managed by that element manger to be detected. The OSS (not shown) may need reconfiguration to arrange for crossover faults between lines terminated at any MSAN in the network managed by that OSS to be detected.

In an alternative embodiment directed to legacy networks, one or more of the concentrator, DLE and OSS may need reconfiguration.

Different types of line interface will have differing capabilities in respect of embodiments. A relatively simple line interface will only report faulty off-hook detected, with a time record being added in the next stage (next layer up the hierarchy, e.g. the MSAN). A more sophisticated line interface will append the time record itself. In this case, the line interface records the time of detection of a fault and sends a fault report including the time of detection to a higher-level controller for detection of linked faults.

The above embodiments have been described with focus on two interfaces located in a single MSAN. Detection of linked faults may then be carried out in the MSAN or, alternatively, in an element manger receiving input from a number of MSANs or in the network management system or OSS to which the faulty off-hook detected reports and faulty off-hook ceased reports are sent.

Telecommunication networks are typically organized in layers to simplify their design and operation. The lowest layer is the network element (equivalent to the MSAN in NGNs) that is managed by an element manager. The element manager is itself managed by a higher-level network management system or OSS. Further embodiments may be implemented in different ways across the various layers, as detailed next.

According to an alternative embodiment, the two line interfaces detecting faults may be accommodated in different MSANs managed by a single element manger. Detection of linked faults may then be carried out in an element manger receiving input from a number of MSANs or in the network management system or OSS to which the faulty off-hook detected reports and faulty off-hook ceased reports are sent.

According to a further, alternative embodiment, the two line interfaces detecting faults may be accommodated in different MSANs connecting into different element mangers. Detection of linked faults may then be carried out in a network management system or OSS to which the faulty off-hook detected reports and faulty off-hook ceased reports are sent.

According to a further embodiment, the two access circuits exhibiting faults and the two line interfaces detecting faults comprise different technologies, e.g. the one being part of a legacy network and the other being part of a NGN.

In assessing crossover faults, the time of occurrence of two faulty off-hook reports from different line interfaces can be used to improve reliability. If the time period between two faulty off-hook reports is excessive, the likelihood is that the reports did not originate from a crossover fault. The presence of a crossover fault may be expected to generate linked faulty off-hook reports within a few milliseconds of each other. However, the time used in assessing whether faulty off-hook reports relate to a crossover fault will be that recorded in the time record appended to each faulty off-hook report. Due to various factors, the time value appended in a time record may be significantly later than the actual time of detection. As a result, a threshold time period much greater than the few milliseconds may be required in order to avoid discounting genuine crossover fault indications.

The precise size of the appropriate time period will depend on the construction of the network, e.g.: the location where the time record is added (whether in the interface, in the MSAN, or elsewhere); how busy the system is (which may affect the delay in appending the time record) and any differences between time-recording clocks in different parts of the network. A typical value will be between one and three seconds in a small or well synchronized network but may, in some systems, extend to ten seconds or more. In general, the length of the time period will tend to increase the further the point at which a crossover fault is recorded is from the point at which current imbalance is detected.

In a refinement in the process for deciding whether a crossover fault has occurred, a sequence of fault reports is monitored and the number of consecutive faulty off-hook reports received is counted. A crossover fault is recorded only if a set number of consecutive faulty off-hook reports are received for each of two access lines. If a different kind of fault report, such as a mimic fault, is received, then the sequence is deemed to be broken and the count is restarted. Advantageously, in order to enhance confidence, the synchronism and repetition criteria are combined so that, where a larger time period is allowed, a longer sequence is required before a crossover fault is deemed to be present.

Further refinement in the process for deciding whether a crossover fault has occurred includes assessing the locations of the access lines in the access network. According to this refinement, faulty off-hook indications received for access lines that are known to be widely spaced, e.g. geographically separated, may be discounted on the basis that there is no realistic opportunity for a crossover to be established between them.

Crossover fault detection according to embodiments advantageously allows crossover faults that were not previously "visible" to those responsible for network maintenance to be detected and rectified. The results of the crossover detection process can be used by the network maintenance team to help plan the maintenance of the network by indicating the lines affected by a crossover fault.

The above embodiments have been described with respect to a current threshold of 25 mA but the skilled reader will appreciate that the appropriate threshold value will vary depending on the specific network and technology. It will be understood that the term "telephone set" referred to above is not limited to voice communications but includes any subscriber equipment capable of putting an access line off-hook.

In a different architecture, according to an embodiment, the call server could be enhanced to perform the functions described above in relation to the element manager, where faulty off-hook events were signaled to the call server, for example as part of a management stream (i.e. distinct from call handling).

Detection of crossover faults is essential to call metering integrity, since this type of fault can lead to two call attempts (via different line interfaces) being originated as a result of a single user terminal going off-hook, with a consequent risk of erroneous call charges being recorded.

Dependent on the specific format of the ringing signal, a crossover fault can also cause either the wrong user terminal to ring or the user terminal on two different customer lines to ring in response to an incoming call to one of the user terminals. As a result, in the presence of a cross-over fault, the answering party the may not be the called party. This will result in a mis-directed call, with the risk that the calling party could be charged for a correctly dialed but incorrectly routed call.

As will be understood by those skilled in the art, embodiments may be implemented in software, any or all of which may be contained on various transmission and/or storage media such as a floppy disc, CD-ROM, or magnetic media so that the program can be loaded onto one or more general purpose computers or could be downloaded over a computer network using a suitable transmission medium. The computer program product used to implement the invention may be embodied on any suitable carrier readable by a suitable computer input device, such as CD-ROM, optically readable marks, magnetic media, punched card or tape, or on an electromagnetic or optical signal The above embodiments are to be understood as illustrative examples of the invention. Further embodiments of the invention are envisaged and will be evident to the skilled reader. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The text of the abstract is incorporated hereby: a system and method for detecting crossover faults in a telecommunications access network comprising a plurality of access lines. Each access line comprises a pair of wires for connection to a user terminal, e.g. a telephone handset. The system comprises: a monitor for monitoring each of the access lines to detect the presence of an off-hook state; a current sensor for each of the access lines for determining a fault condition on an access line for which an off-hook state has been detected when a imbalance is detected between currents in the wires of the access line; a controller for generating a report of each fault condition determined on an access line, in which each report comprises a time record relating to the time of generation of the report; and a crossover fault detector for recording a possible crossover fault involving two access lines upon the reporting within a set time period of one or more fault condition on each of the two access lines.

The invention claimed is:

1. A method for detecting crossover faults in a telecommunications access network, in which the access network comprises a plurality of access lines in which each access line comprises a pair of wires for connection to a user terminal, the method comprising:
    monitoring each of the access lines to detect an off-hook state;
    checking for current flow in each wire of each of the access lines for which an off-hook state is detected;
    determining a fault condition for each access line for which an off-hook state is detected, when an imbalance is detected between currents in the wires of the access line;
    creating a fault report for each fault condition determined for an access line in which the fault report comprises a record of a time of creating the report; and
    recording a crossover fault involving two of the access lines when one or more fault condition is reported on each of the two access lines within a set time period.

2. A method as claimed in claim 1 including:
    monitoring sequences of occurrences of the fault condition on the two access lines; and
    recording a crossover fault involving the two access lines when a sequence of consecutive faults is reported for each of the two access lines.

3. A method as claimed in claim 2 including recording a crossover fault involving the two access lines when a sequence of consecutive faults is reported on each of the two access lines and when each fault in a first one of the sequences forms a pair with a corresponding fault in the other one of the sequences and each fault of a pair of faults is reported within a set time period of the other fault of the pair.

4. A method as claimed in claim 2 including adjusting a length of a required sequence of consecutive faults so that the sequence length is greater for longer time periods.

5. A method as claimed in claim 1 including setting the time period in dependence on access network characteristics.

6. A method as claimed in claim 1 including creating the fault report in one of a line interface and a controller.

7. A method as claimed in claim 1 including sending the fault report to a controller for recording a possible crossover fault involving the two access lines.

8. A method as claimed in claim 6 in which the controller is one of a MSAN, an element manager, a call server, a network management system and an OSS.

9. A system for detecting crossover faults in a telecommunications access network, in which the access network comprises a plurality of access lines in which each access line comprises a pair of wires for connection to a user terminal, the system comprising:
    a monitor for monitoring each of the access lines to detect a presence of an off-hook state;
    a current sensor for each of the access lines for determining a fault condition on an access line for which an off-hook state has been detected when an imbalance is detected between currents in the wires of the access line;
    a controller for generating a report of each fault condition determined on an access line, in which each report comprises a time record relating to a time of generation of the report; and
    a crossover fault detector for comparing reports of fault conditions and recording a crossover fault involving two access lines upon a reporting within a set time period of a fault condition on each of the two access lines.

10. A system as claimed in claim 9 in which the crossover fault detector is arranged in use to vary the time period in dependence on access network characteristics.

11. A system as claimed in claim 9 in which the crossover fault detector is arranged in use to monitor sequences of occurrences of the fault condition on the two access lines and to record the crossover fault involving the two access lines when a sequence of consecutive faults is recorded on each of the two access lines.

12. A system as claimed in claim 9 in which the crossover fault detector is arranged in use to record the crossover fault involving the two access lines when a sequence of consecutive faults is recorded on each of the two access lines and when each fault in a first one of the sequences forms a pair with a corresponding fault in the other one of the sequences and each fault of a pair of faults is recorded within a set time period of the other fault of the same pair.

13. A system as claimed in claim 11 in which the crossover fault detector is arranged in use to adjust a length of a required sequence of consecutive faults so that the sequence length is greater for longer time periods.

* * * * *